Jan. 13, 1931.    C. R. LEITER    1,788,679
STUD SETTER
Filed Jan. 6, 1930
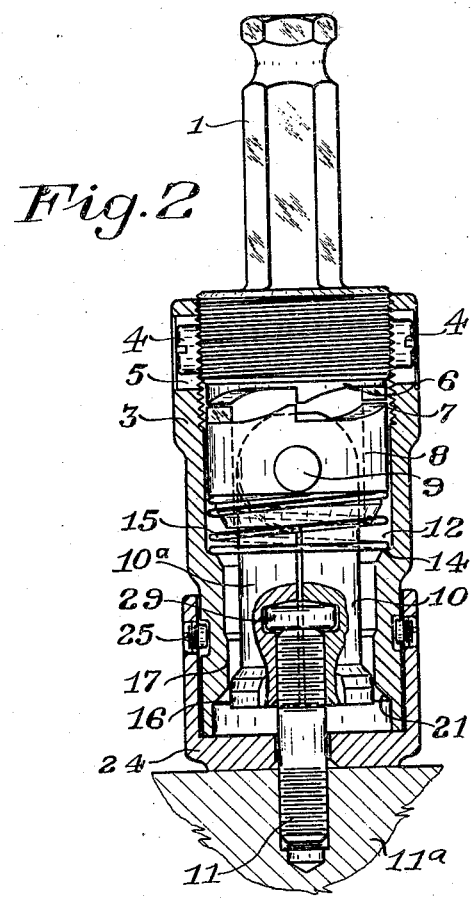
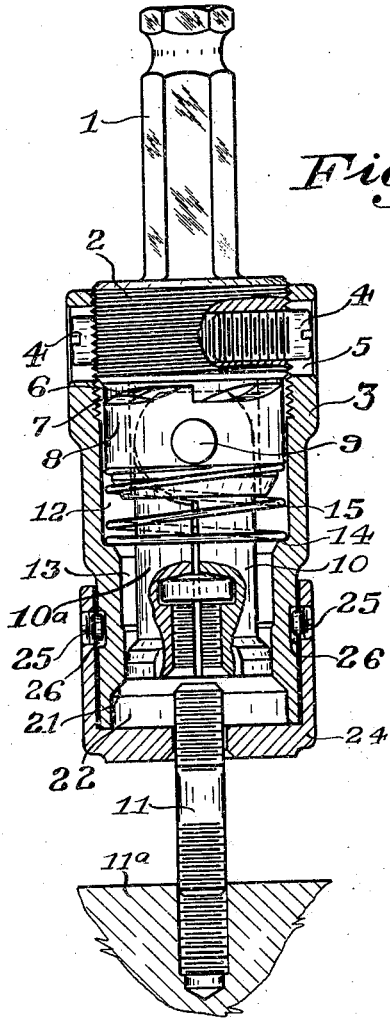
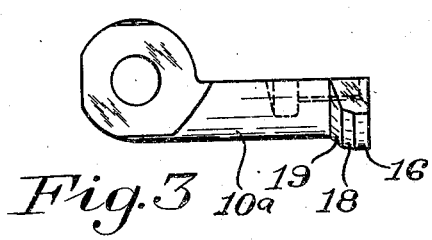
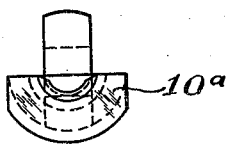
INVENTOR
Charles R. Leiter
BY Harold E. Stonebraker
his ATTORNEY Patented Jan. 13, 1931

1,788,679

UNITED STATES PATENT OFFICE

CHARLES R. LEITER, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

STUD SETTER

Application filed January 6, 1930. Serial No. 418,938.

This invention relates to improvements in stud setters or devices for setting studs in threaded bores or openings.

The object of the invention is to provide a stud setter which is simple in construction, inexpensive to make, and more efficient in operation than stud setters previously used.

Another object of the invention is to provide a stud setter having a driving clutch with resilient means for maintaining the parts of the clutch in operative engagement.

Still another object of the invention is to provide a split nut which engages a stud to be set with a cam, permitting it to turn freely when the driving clutch is released, thus relieving the parts of the split nut from unnecessary strain.

To these and other ends, the invention consists in the construction and arrangement of parts that will appear from the following description when read in conjunction with the accompanying drawings, the novel features being pointed out in the claims following the specification.

In the drawings:

Figure 1 is a transverse vertical section of a stud setter constructed according to one embodiment of the invention;

Figure 2 is a similar view showing parts in another position;

Figure 3 is a side view of one of the jaws forming part of a split nut, and

Figure 4 is an end view of the same.

Referring more particularly to the drawings in which similar reference numerals refer to like parts in the several figures, 1 designates a shank having an angular portion adapted to be engaged by a suitable tool for rotating the same. The shank 1 has an enlarged end forming a block or head 2 which is threaded externally for cooperation with internal threads in the upper end of a shell or sleeve 3, whereby the head is adjustably connected with the sleeve. Threaded openings are provided in diametrically opposite sides of the head for the reception of radially arranged screws 4, the heads of which engage vertically elongated slots 5 in the sleeve 3 and hold it in adjusted position on the head.

Secured to or integral with the lower end of the head 2 is one member 6 of a clutch, the other member 7 of which is provided on the upper end of a collar or ring 8, movably mounted in the sleeve 3. The collar 8 is adapted to move axially in the sleeve 3 and has a transversely arranged pivot 9 therein on which are pivotally mounted a pair of jaws 10 and 10ª arranged in the sleeve and extending downwardly from the pivot, as seen in the drawings, or in the general direction of its axis. The jaws 10 and 10ª move longitudinally in the sleeve 3 with the collar 8, and the lower ends are adapted to move substantially radially of the sleeve toward and from each other, such radial movement of the jaws being controlled by the interior wall of the sleeve 3 engaged thereby.

The members 10 and 10ª have complementary internal threads at their lower ends forming the complementary parts of a split nut adapted to engage the threaded end of a stud 11 to be set in a threaded opening in a work piece 11ª. The sleeve 3 has an enlarged portion 12 at its upper end in which the collar 8 is adapted to either revolve or move axially. At its lower end, the portion 12 merges into a more constricted portion 13, a seat 14 for a spring 15 being provided between them. The spring 15 is coiled about the jaws 10 and 10ª, and arranged between the seat 14 and the collar 8, and tends to resiliently move the collar into clutching engagement with the block 2, so that the collar 8 and the split nut mounted thereon turn as a unit with the block 2 and sleeve 3 in one direction, the parts of the clutch being adapted to move the member 8 to disengage the clutch when turned in the reverse direction unless free to turn therewith.

At the lower end, the split nut is provided with a cylindrical bearing surface 16 adapted to engage a bearing surface 17 in the lower end of the restricted portion 13 of the sleeve 3. Adjacent the bearing surface 16 is an inwardly and upwardly inclined portion 18 forming a cam surface, which in turn terminates in a portion 19 sharply inclined inwardly toward the axis of the split nut. Below the bearing portion 17 in which the split nut fits snugly in the sleeve, the opening in the sleeve widens along an outwardly and downwardly inclined surface 21, terminating in an opening 22 at its lower end which is of greater diameter than the diameter of the sleeve at 17. The lower end of the sleeve 3 may be closed by means of a cap or block 24 seated thereon, and connected thereto by means of diametrically arranged studs 25 mounted in tapped openings in the cap, and at their inner ends engaging a circumferential groove 26 in the sleeve 3. By this arrangement, the cap is adapted to turn freely on the sleeve, and it will be noted that when the bearing surfaces 16 and 17 are in engagement, as seen in Figure 1, the parts of the split nut are contracted to operative position and the collar 8 is operatively connected with the block 2 to rotate therewith.

This position of the parts is maintained until the block 24 reaches the work piece 11ª, when further axial movement of the stud moves the split nut and collar 8 axially against the tension of the spring 15 until the members of the clutch are disengaged and the bearing 16 has simultaneously passed out of the bearing surface 17, as shown in Figure 2. At this time, the block 2 and sleeve 3 may turn relatively to the cap 24 which engages the work piece 11ª. The point where the work piece stops the movement of the sleeve may be varied by changing the thickness of the block 24. The point at which the clutch members are disengaged may be varied by adjusting the sleeve on the block 2. If the operator now raises the shank and with it the sleeve, the latter moves relatively to the split nut which still engages the stud, and the cam surface 18 on the nut moves outwardly on the cam surface 21 in the sleeve, thus permitting the members of the split nut to expand and release the stud so that the tool may be withdrawn. As soon as the stud is withdrawn from the split nut, the spring 15 operates to return the split nut to the initial position shown in Figure 1.

It will be noted that by this arrangement of the parts, driving connection between the block 2 and the split nut is broken substantially at the instant when the bearing surface 16 passes out of the restricted portion 17 of the sleeve, permitting the nut to expand and be released from driving engagement with the nut. In other words, when the driving connection between the nut and the shank breaks by disengagement of the clutch members, the enlarged portion 16 of the nut moves from the constricted portion of the sleeve and permits the nut to expand, thus releasing it from driving connection with the stud. The cam 18, however, still maintains the threads of the nut in engagement with the threads of the stud, so that movement of the sleeve away from the work piece 11ª moves the nut until it can expand sufficiently in the enlarged end of the sleeve to release the stud.

In operation, the stud to be set is sufficiently engaged with the work piece to hold it therein, as shown in Fig. 1. The rotating stud setter with the parts of the clutch engaged under the action of the spring and the enlarged bearing portion of the split nut confined in the constricted portion of the sleeve or casing to maintain its parts in operative position, is threaded on to the stud until the end of the stud engages the block 29. Further rotation of the stud setter turns the stud with it and turns it into the tapped opening in the work piece, the stud setter moving with the stud until it engages the work piece. When the end of the stud setter engages the work piece, axial movement of the casing and the shank is stopped, but they continue to rotate and turn the stud to drive it deeper into the work piece. This further movement of the stud operates to move the split nut and the clutch member on which it is mounted automatically against the action of the spring to disengage the clutch, and simultaneously the enlarged portion on the split nut passes into the enlarged part of the casing or sleeve and releases the stud from turning or driving connection therewith. The cam 18 on the nut now engages the restricted portion of the sleeve and maintains the nut loosely in threaded engagement with the stud, as seen in Fig. 2. If the stud setter be now lifted from the work piece, the stud pulls the nut farther toward the end of the sleeve and its cam from the constricted portion of the sleeve, which permits the nut to expand into the enlarged opening in the end of the sleeve and move from the stud. As soon as the nut has moved from the stud, the spring automatically returns the parts to the Fig. 1 position.

If desired, a chamber may be provided between the jaws 10 and 10ª adjacent the upper end of the split nut, in which is loosely seated a hardened disk 29 adapted to operate as a buffer for the upper end of the stud to relieve the jaws from wear and strain.

It will be noted that by adjusting the sleeve on the block 2, the extent of movement of the sleeve with the stud before the block 24 engages the work piece 11ª may be varied, thus varying the extent to which the stud is driven into the work piece before the driving connection through the clutch is automatically broken.

While the invention is described with reference to a single embodiment thereof, it will be understood that this application is intended to cover such changes or modifications as may come within the spirit of the invention or scope of the following claims.

I claim:

1. In a stud setter, the combination with a rotated member, a clutch member thereon, of a sleeve on the rotated member, said sleeve having an enlarged opening and a constricted portion adjacent thereto, a pair of pivoted jaws movable axially in said sleeve, a clutch member on said jaws adapted to engage the first mentioned clutch member for operatively connecting the jaws to the rotated member, a bearing on the jaws cooperating with said constricted portion of the sleeve for maintaining the jaws normally contracted for operative engagement with a stud to be set but movable from the constricted portion to the enlarged opening in the sleeve to release the jaws from the stud and simultaneously disengage said clutch members, and a cam on the jaws engaging the sleeve for maintaining interengagement between them and the stud.

2. In a stud setter, the combination with a split nut adapted to engage a threaded stud to be set in a tapped opening in a work piece, of a revoluble sleeve in which the nut is mounted and which is movable axially with the stud when the latter is set in the work piece, disengageable means for operatively connecting the nut with the sleeve to rotate therewith, a bearing member on the nut adapted to engage a constricted portion of the sleeve when rotatively connected thereto to contract the nut to rotatively engage the stud and drive it into the work piece, means for stopping movement of the sleeve relative to the work piece when the stud approaches the limit of its movement, further movement of the stud operating to move the nut to disengage it from rotatable connection with the sleeve and its bearing member from the constricted portion of the sleeve to release it from driving connection with the stud, and interengaging means on the nut and the sleeve for maintaining the nut engaged with the stud during continued relative movement thereof.

3. In a stud setter, the combination with a revoluble shank having a head thereon, a clutch member on said head, a sleeve mounted on said head to rotate therewith and having an enlarged opening and a constricted bearing surface adjacent thereto, a second clutch member revolubly mounted in said sleeve and movable to and from engagement with the first mentioned clutch member, a split nut mounted on said second clutch member movable axially therewith and adapted to engage a threaded stud to be set in a tapped opening in a work piece, a bearing surface on the nut adapted to engage the constricted bearing surface in the sleeve when the second clutch member engages the first mentioned clutch member to be rotated thereby to contract the nut to operatively engage the stud to drive it into the work piece, means on the sleeve movable into engagement with the work piece when the stud approaches the limit of its movement, further movement of the stud being operative to move the nut and with it the second clutch member to disengage it from driving connection with the shank and the bearing surface of the nut from the constricted portion of the sleeve to release it from driving connection with the stud, a cam on the nut adjacent said bearing surface for maintaining the nut in threaded engagement with the stud when released from driving connection therewith, and resilient means for moving the second clutch member into engagement with the first mentioned clutch member.

In witness whereof, I have hereunto signed my name.

CHARLES R. LEITER.